US012694466B2

(12) United States Patent
Palo et al.

(10) Patent No.: US 12,694,466 B2
(45) Date of Patent: Jul. 28, 2026

(54) METHODS, SYSTEMS, AND COMPUTER READABLE MEDIA FOR GENERATING AND USING UNBINNED IMAGE DATA

(71) Applicant: PerkinElmer Cellular Technologies Germany GmbH, Hamburg (DE)

(72) Inventors: Kaupo Palo, Waltham, MA (US); Peet Kask, Waltham, MA (US)

(73) Assignee: Revvity Cellular Technologies GmbH, Hamburg (DE)

( * ) Notice: Subject to any disclaimer, the term of this patent is extended or adjusted under 35 U.S.C. 154(b) by 490 days.

(21) Appl. No.: 17/956,639

(22) Filed: Sep. 29, 2022

(65) Prior Publication Data

US 2024/0119556 A1     Apr. 11, 2024

(51) Int. Cl.
*G06T 3/40*          (2024.01)

(52) U.S. Cl.
CPC ..................................... *G06T 3/40* (2013.01)

(58) Field of Classification Search
CPC ... G06T 3/40; G06T 2207/20216; G06T 5/73;
G06T 3/4053
See application file for complete search history.

(56) References Cited

U.S. PATENT DOCUMENTS

2010/0074486 A1* 3/2010 Broser ...................... G06T 5/50
382/128

FOREIGN PATENT DOCUMENTS

WO     WO 2022/169139 A1     8/2022

OTHER PUBLICATIONS

Grosche, Simon, et al. "Image Super-Resolution Using T-Tetromino Pixels." arXiv e-prints (2021): arXiv-2111. (Year: 2021).*
Symons, Teresa, et al. "Superresolution Reconstruction of Severely Undersampled Point-spread Functions Using Point-source Stacking and Deconvolution." The Astrophysical Journal Supplement Series 252.2 (2021): 24. (Year: 2021).*
Azzari, Lucio, and Alessandro Foi. "Variance stabilization for noisy+ estimate combination in iterative Poisson denoising." IEEE signal processing letters 23.8 (2016): 1086-1090. (Year: 2016).*
Ma, Yubing, Qionghai Dai, and Jingtao Fan. "Measuring the point spread function of a wide-field fluorescence microscope." Optoelectronic Imaging and Multimedia Technology VI. vol. 11187. SPIE, 2019. (Year: 2019).*
Chuah, et al., "An adaptive image interpolation algorithm for image/video processing", Pattern Recognition, Elsevier, GB, vol. 34, No. 12, pp. 1-11 (Dec. 2001).
(Continued)

*Primary Examiner* — Sumati Lefkowitz
*Assistant Examiner* — Connor L Hansen
(74) *Attorney, Agent, or Firm* — Jenkins, Taylor & Hunt, P.A.

(57)          ABSTRACT

Disclosed herein are methods, systems, and computer-readable media for generating and using unbinned image data, characterized by (a) receiving image data corresponding to an image; (b) generating the unbinned image data by performing an unbinning operation on the received image data, wherein the unbinning operation is characterized by conditions of invertibility and smoothness; and (c) using the unbinned image data for either: (i) displaying a version of the image based on the unbinned image data; and/or (ii) performing image processing.

17 Claims, 15 Drawing Sheets

(56)               References Cited

OTHER PUBLICATIONS

Geiss, et al., "Invertible CNN-Based Super Resolution with Downsampling Awareness", ARXIV.org, Cornell University Library, pp. 1-16 (Nov. 2020).

Giachetti, et al., "Real-Time Artifact-Free Image Upscaling", IEEE Transactions on Image Processing, vol. 20, No. 10, pp. 1-9 (Oct. 2011).

Notification of Transmittal of The International Search Report and the Written Opinion of the International Searching Authority, or the Declaration for International Application Serial No. PCT/IB2023/000584 (Mar. 19, 2024).

"Quantization (signal processing)", Wikipedia, Apr. 9, 2011, https://en.wikipedia.org/wiki/Quantization_(signal_processing).

"Interpolation", Wikipedia, Mar. 22, 2007, https://en.wikipedia.org/wiki/Interpolation.

"Upsampling", Wikipedia, Dec. 23, 2004, https://en.wikipedia.org/wiki/Upsampling.

"Downsampling (signal processing", Wikipedia, Dec. 23, 2004, https://en.wikipedia.org/wiki/Downsampling_(signal_processing).

"Data binning", Wikipedia, Jul. 28, 2008, https://en.wikipedia.org/wiki/Data_binning.

* cited by examiner $$LHS_{Band} = \begin{bmatrix} 0 & 0 & 5 & -4 & 1 \\ 0 & -4 & 6 & -4 & 1 \\ 1 & -4 & 6 & -4 & 0 \\ 1 & -4 & 6 & 1 & 0 \\ 0 & 1 & 6 & -4 & 1 \\ 0 & -4 & 6 & -4 & 1 \\ 1 & -4 & 6 & -4 & 0 \\ 1 & -4 & 6 & 1 & 0 \\ 0 & 1 & 6 & -4 & 1 \\ 0 & -4 & 6 & -4 & 1 \\ 1 & -4 & 6 & -4 & 0 \\ 1 & -4 & 6 & 1 & 0 \\ 0 & 1 & 6 & -4 & 1 \\ 0 & -4 & 6 & -4 & 1 \\ 1 & -4 & 6 & -4 & 0 \\ 1 & -4 & 6 & 1 & 0 \\ 0 & 1 & 6 & -4 & 1 \\ 0 & -4 & 6 & -4 & 1 \\ 1 & -4 & 6 & -4 & 0 \\ 1 & -4 & 6 & 1 & 0 \\ 0 & 1 & 6 & -4 & 1 \\ 0 & -4 & 6 & -4 & 1 \\ 1 & -4 & 6 & -4 & 0 \\ 1 & -4 & 5 & 0 & 0 \end{bmatrix}$$

FIG. 9

RECEIVE IMAGE DATA CORRESPONDING TO AN IMAGE ⟶ 1500

GENERATE UNBINNED IMAGE DATA BY PERFORMING UNBINNING OPERATION CHARACTERIZED BY CONDITIONS OF INVERTIBILITY AND SMOOTHNESS ⟶ 1502

USE UNBINNED IMAGE DATA FOR EITHER: (i) DISPLAYING VERSION OF IMAGE BASED ON UNBINNED IMAGE DATA; AND/OR (ii) PERFORMING IMAGE PROCESSING ⟶ 1504

METHODS, SYSTEMS, AND COMPUTER READABLE MEDIA FOR GENERATING AND USING UNBINNED IMAGE DATA

TECHNICAL FIELD

The subject matter described herein relates to unbinning image data. More particularly, the subject matter described herein relates to methods, systems, and computer readable media for generating and using unbinned image data.

BACKGROUND

In image processing, binning refers to a process where data, e.g., intensity values, from multiple input pixels are combined into a single intensity value corresponding to a single output pixel, where that single output pixel and its intensity value become representative of the multiple input pixels. Some reasons for performing pixel binning include reducing image/data size and noise reduction. One example of a pixel binning operation is an averaging operation, where data from multiple input pixels is averaged to produce a value for a single output pixel.

One problem associated with pixel binning is loss of information regarding the original pixel data, e.g., intensity values. Continuing with the averaging example using intensity data, if multiple input pixel intensity values are averaged to generate a single output pixel intensity value, reversing the operation, or attempting to reproduce the multiple input pixel intensity values from the single output pixel intensity value, is not possible.

Since loss of information is undesirable in image processing, there exists a need for improved methods, systems, and computer readable media for processing image data that reduces the likelihood of information loss after a binning or other image processing operation.

SUMMARY

Disclosed herein are methods and systems for generating and using unbinned image data, the methods including (a) receiving image data corresponding to an image; (b) generating the unbinned image data by performing an unbinning operation on the received image data, wherein the unbinning operation is characterized by conditions of invertibility and smoothness; and (c) using the unbinned image data for either: (i) displaying a version of the image based on the unbinned image data; and/or (ii) performing image processing. In certain embodiments, generating the unbinned image data includes (i) defining an unbinned vector b*, wherein each element of the vector b* has a value equal to a value of the received image data; (ii) determining an unbinned vector $\tilde{b}$ as a sum of the unbinned vector b* and a transposed bin-constrained derivative $$d_B^T$$

applied to a vector of unknown parameters a; and, (iii) solving for the values of the unknown parameters a, while imposing the condition of smoothness on the unbinned vector $\tilde{b}$. In embodiments, determining an unbinned vector $\tilde{b}$ includes computing a sum using the following expression:

$$\tilde{b} = b^* + d_B^T a.$$

For some embodiments of the disclosed methods and systems, solving for the values of the unknown parameters, a, includes using the following expression:

$$(d_B \Delta^{(k)} d_B^T) a = -d_B \Delta^{(k)} b^*,$$

where $\Delta(k)$ is a Laplacian operator, and k is a positive integer greater than or equal to 1, for example, k=1. In some examples, the image data comprises multi-dimensional image data, and performing the unbinning operation includes performing the unbinning operation for each dimension of the multi-dimensional image data.

In some aspects of the disclosed methods and systems, the condition of smoothness is characterized by minimizing a sum of squares of derivatives of the values of elements of the unbinned image data. In embodiments, the unbinned image data comprises a vector $\tilde{b}$, and the condition of smoothness comprises minimizing a sum of the squares of the derivatives of the values of the elements of vector $\tilde{b}$. In certain embodiments, the unbinned image data may be used to determine a property of an optical system (e.g., microscope) associated with the image data, for example, to determine a point spread function of the optical system. In certain embodiments, the received image data is pixel intensity data.

Also disclosed are systems for generating and using unbinned image data, the systems including (a) a computing platform including at least one processor and a memory; (b) an unbinned image data generator implemented by the at least one processor for performing an unbinning operation on image data corresponding to an image, wherein the unbinning operation is characterized by a condition of invertibility and a condition of smoothness; and, (c) a memory to receive the unbinned image data for either: (i) displaying a version of the image based on the unbinned image data; and/or (ii) performing image processing. The unbinned image data generator may be configured to: (a) generate an unbinned vector b*, wherein each element of the vector b* has a value equal to a value of the image data; (b) determine an unbinned vector $\tilde{b}$ as a sum of the unbinned vector b* and a transposed bin-constrained derivative $$d_B^T$$

applied to a vector of unknown parameters, a; and (c) solve for the values of the unknown parameters a, while imposing the condition of smoothness on the unbinned vector $\tilde{b}$.

In embodiments, the unbinned image data generator is configured to compute a sum using the following expression:

$$\tilde{b} = b^* + d_B^T a,$$

and in some embodiments, the unbinned image data generator solves for the values of the unknown parameters a using the following expression:

$$(d_B \Delta^{(k)} d_B^T) \alpha = -d_B \Delta^{(k)} b^*,$$

where $\Delta^{(k)}$ is a Laplacian, and k is a positive integer greater than or equal to one, for example, k=1. In some embodiments, the image data comprises multi-dimensional image data and the unbinned image data generator performs the unbinning operation for each dimension of the multi-dimensional data.

Also disclosed is a non-transitory computer readable medium having stored thereon executable instructions that, when executed by a processor of a computer, control the computer to generate unbinned image data by performing an unbinning operation on image data corresponding to an image, wherein the unbinning operation is characterized by a condition of invertibility and a condition of smoothness; and store the unbinned image data for either: (i) displaying a version of the image based on the unbinned image data; and/or (ii) performing image processing. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 3 is a matrix $d_B$ for calculating first order derivatives of a vector a;

FIG. 9 is a band matrix representation of the square matrix illustrated in FIG. 7;

DETAILED DESCRIPTION

The subject matter described herein introduces an operation of image analysis—unbinning—which is inverse to another and more widely used operation of binning. Typically, binning is an operation to create a reduced-size image, where image intensities from a set of pixels are combined (e.g., averaged) to yield a single pixel that will be part of the binned image. An objective of this operation is usually reducing the size of the image, but other objectives include reducing random noise in pixels, etc. Accordingly, it is common practice to create a binned, reduced-size image so that the original data may be deleted; however, binning is accompanied by a loss of information, and if the original image data is not saved and such information is required in the future, there is currently no manner to recreate the original "input" pixel image data from the binned pixel/image data.

Binning and unbinning are close relatives to another pair of operations, downsampling and upsampling. Although there are similarities, binning and unbinning are not viewed as synonyms of upsampling and downsampling. A basic difference is that downsampling and upsampling operations are performed on data where each data unit represents a point in time (or space), while binning is applied to data where each unit represents an interval in space (or time). Therefore, a downsampling operation is often realized as selecting only a part (e.g., each n-th data point, where n>1) of original data, while binning is typically performed by averaging a set of pixels of the original (image) data. Correspondingly, upsampling, which acts to reverse downsampling, is a special case of interpolation, since unknown values at intermediate points are interpolated from known values at neighboring points.

Figure 1:
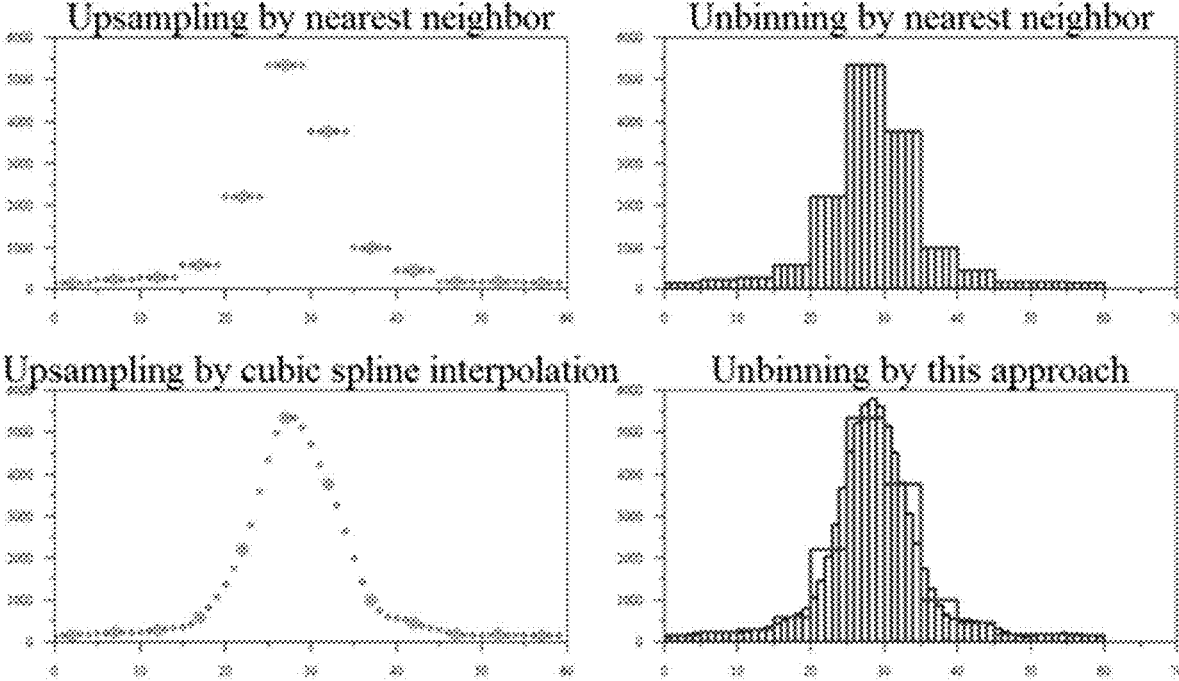
FIG. 1 illustrates graphs comparing data upsampling and unbinning approaches.

The difference between data in points and data in intervals as well as between upsampling and unbinning is illustrated in FIG. 1. Referring to FIG. 1, the graphs in the left-hand column illustrate upsampling of data points using common techniques of nearest neighbor and cubic spline interpolation, as titled, with the larger circles in the left-hand column graphs (being the same in each) denoting the "original" data points before upsampling, for a one-dimensional example, and the smaller points representing upsampled points using the applicable method. The right-hand column figures show, respectively, the result when an unbinning process is applied to the original data from each of the figures in the left-hand column when that original data is represented as interval (rather than point) data, and the equivalent nearest neighbor and cubic spline unbinning techniques are used/applied thereto, respectively, as indicated. The larger rectangles in the right-hand column represent the sampling interval of the original data before unbinning is performed, and the smaller rectangles in the right-hand column illustrate the sample data intervals after unbinning. As can be seen in FIG. 1, for this example, the bin size, s, or number of data points in a bin after unbinning, is five, although such bin size is merely an example provided for illustration and not limitation. It may also be observed from FIG. 1 that the nearest neighbor versions of upsampling and unbinning (i.e., the upper row of graphs) are mathematically equivalent, while the "smooth" or cubic spline versions (i.e., the lower row of graphs) are not mathematically equivalent.

From FIG. 1, it can be observed that a "downsampling" of either version of the "upsampled data" (i.e., FIG. 1, column 1) will return the original data (e.g., for downsampling, select the third point of the upsampled data, and then every fifth data point thereafter), while in contrast, performing a binning on either of the unbinned data (i.e., FIG. 1, column 2) will not return the initial data. The disclosed methods and systems seek to address this issue.

The subject matter described herein includes an approach to unbinning such that unbinning and binning operations applied consecutively would return the "original" or input data, including multi-dimensional input data. The methods and systems disclosed herein can thus be applied sequentially to each dimension of multi-dimensional image data, and the order of such application to each dimension of multi-dimensional data is not relevant to the disclosed methods and systems. The condition that the unbinning and binning operations return the input data is referred to as a condition of invertibility, which is described further herein. There may be many ways to achieve invertibility. For example, one way is to repeat each element of the input data (e.g., array) many times in the output array; however, the present disclosure differs from such methods by imposing an additional condition of smoothness on values of the unbinned data (e.g., an array or other result of the disclosed unbinning process), thereby resulting in at least some of the unbinned data being unequal to other unbinned data representing the same input pixel.

The subject matter described herein provides an unbinning solution that has a minimized value of irregularity. For example, one measure of irregularity is an integrated square of the first (generally, r-th) derivative of the solution (i.e., the unbinned data or result of the unbinning process disclosed herein). Additionally, a constraint can be applied to the minimization process, for example, a constraint to the unbinning solution can be that the result of a binning operation, when applied to the unbinned solution, is, e.g., substantially exactly the input array. Minimization of a measure of irregularity, together with the constraint, allow for certainty of data preservation throughout an unbinning and binning sequence of operations. There are many other solutions satisfying the constraint, but other solutions may be less regular (e.g., less smooth, more intermittent) than the solution described herein.

The unbinning disclosed herein will be applied to one-dimensional arrays, although those of ordinary skill will understand that the same techniques may be applied to multidimensional array data (e.g., images and volumes (3D-images)) by applying the disclosed unbinning techniques in different dimensions consecutively. For example, the result or solution of computing unbinned data for a first selected dimension may be the input data to a second next dimension, etc., until an unbinning solution for all dimensions is computed; however, those of ordinary skill will understand that the solution for all applicable dimensions is not dependent on a specific order of processing the dimensions. Said differently, the methodologies described herein can be used to unbin multidimensional data such as 2D and 3D image data by applying the unbinning process described herein to each dimension, in succession, with order of dimension of no relevance to the final result.

In summary, using the unbinning methods described herein, a single value in the input or original data is replaced with multiple (i.e., equal to the size of the bin, (s) values, where the mean of such multiple values is the original input value. As provided previously, one unbinning approach, and perhaps the simplest, is the nearest neighbor approach. The nearest neighbor approach to unbinning replaces each point of the input array by s equal points in the output/unbinned result, as illustrated in the upper right-hand side graph of FIG. 1. This nearest neighbor approach is thus simple to apply but usually its result is not satisfactory because the result has discontinuities (e.g., in the case of pixel intensities, it is not practical that a first intensity would be held for a number of pixels, before suddenly jumping to a second intensity for another set of pixels at that same second intensity).

The methods disclosed herein take this nearest neighbor approach, representing the nearest neighbor values of each bin as a vector, and add an arbitrary, zero sum vector to each bin, without changing the mean value. Accordingly, if we denote the input array by b as a column vector of n elements, a "trivially" unbinned vector (i.e., derived using the nearest neighbor approach) may be denoted by b*. The trivially unbinned vector b* is represented by larger rectangles in the upper right-hand graph of FIG. 1. The trivially unbinned vector b* has ns elements, where n is the number of data elements in the input array, and s is bin size, and can be easily calculated using no unknown parameters. In examples shown in FIGS. 1, n=12 and s=5. For a one-dimensional data set, such as shown in FIG. 1, b* is a column vector having s rows, where each row corresponds the data value of a given bin.

The disclosed methods and systems thus add an arbitrary zero sum (i.e., zero mean) "correction" vector of the form $$d_B^T a$$

to each bin of b*, without changing the mean, and then search for an unbinned solution of the form:

$$\tilde{b} = b^* + d_B^T a \tag{1}$$

As already explained, the subject matter described herein searches for a solution with minimized value of irregularity, which is also described herein as the smoothness constraint. An additional constraint to the solution is invertibility, meaning that an input array, having undergone an unbinning and then subsequently a binning process, can be returned to substantially the same input array. Accordingly, a is a vector of unknown coefficients and $d_B$ is a matrix of calculating, e.g., first order derivatives within (but not between) each input data element (i.e., each bin). For the present examples, it shall be understood that a data element represents a pixel of an image, and more specifically in the illustrated embodiment, a pixel intensity value; however, those of ordinary skill will understand that the disclosure is not limited to this data type.

It can thus be understood that corresponding to each data element/pixel of the input array, there will be s resulting pixels, however, final values (e.g., intensities) of those s resulting pixels are determined via s-1 free parameters such that the sum of corrections $$\left(d_B^T a\right)$$

to b* over those s resulting pixels must be zero (i.e., zero mean) by the invertibility constraint. The s-1 derivatives have been selected as unknown parameters of the solution. For example, generally, a matrix d for calculating first order derivatives for a five-element column vector within each bin is:

$$d = \begin{bmatrix} -1 & 1 & 0 & 0 & 0 \\ 0 & -1 & 1 & 0 & 0 \\ 0 & 0 & -1 & 1 & 0 \\ 0 & 0 & 0 & -1 & 1 \end{bmatrix} \quad (2)$$

Figure 2:
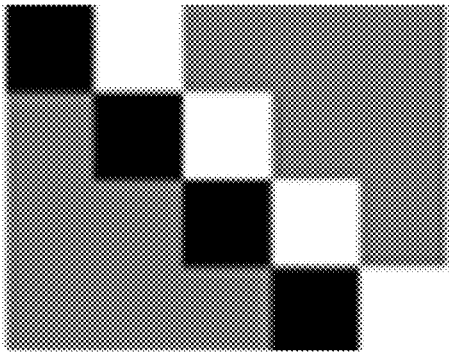
FIG. 2 is an intensity coding representation of a 4×5 matrix for calculating first order derivatives.

FIG. 2 illustrates an intensity coding representation of the matrix in Equation (2).

Figure 3:
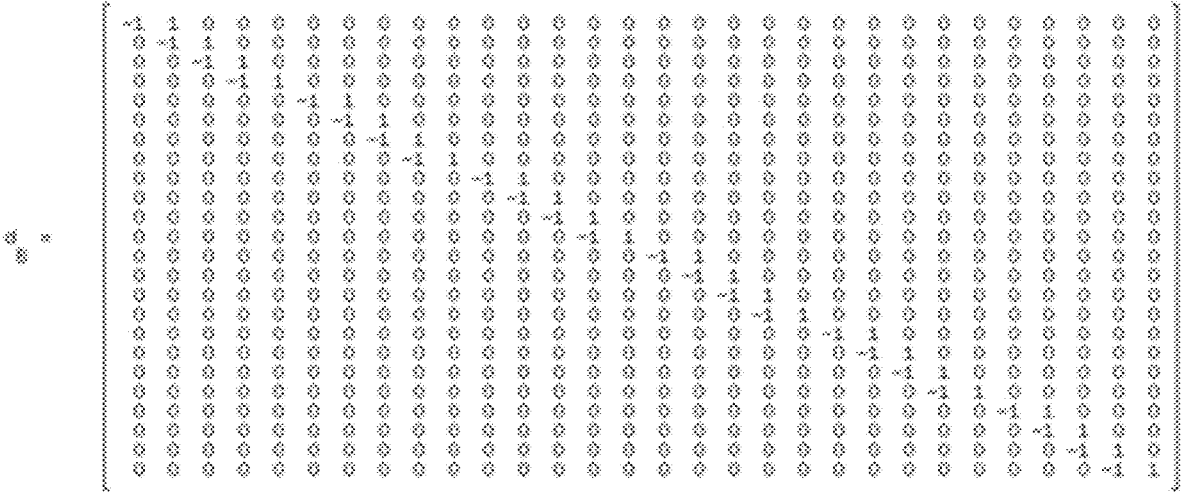
Figure 4:
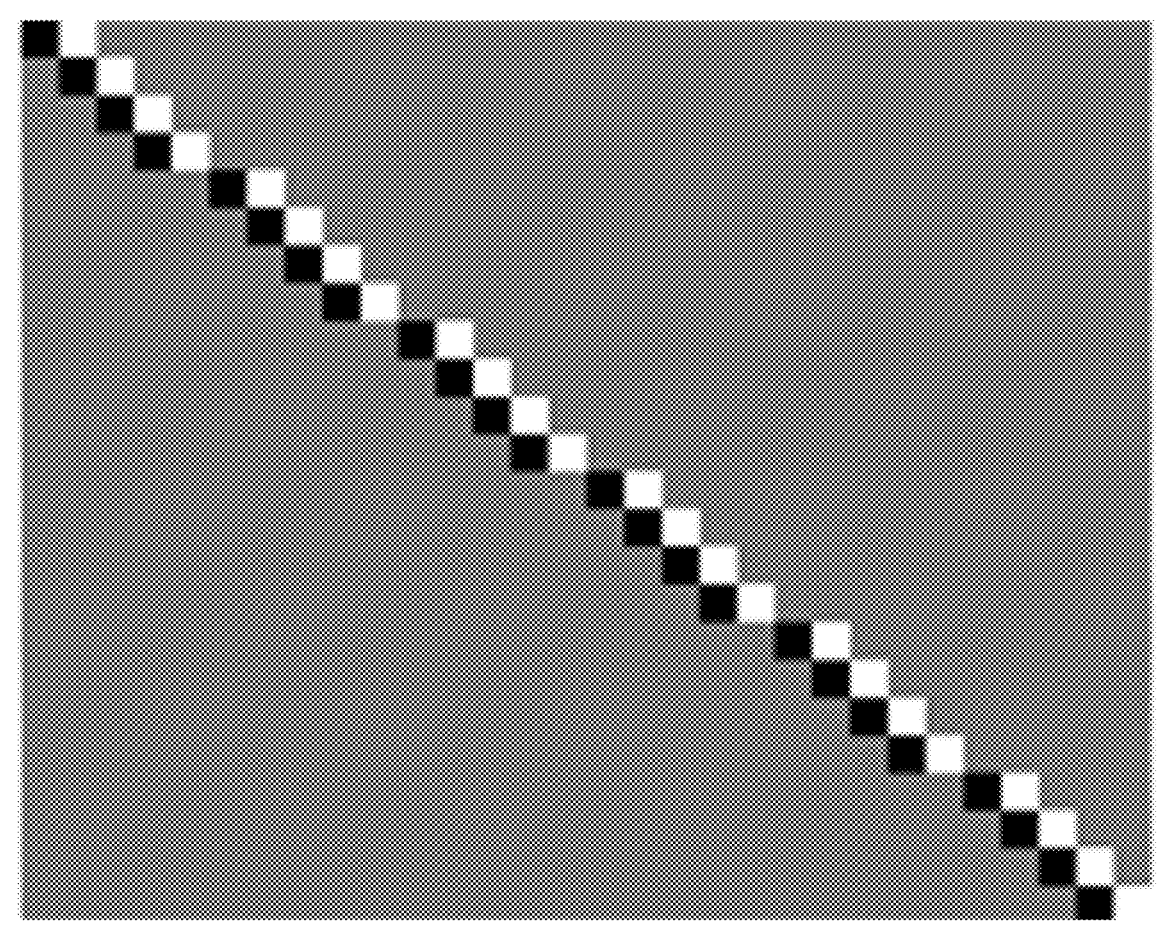
FIG. 4 is an intensity coding representation of the matrix in FIG. 3.

With reference to Equation (1), the matrix $d_B$ is a combination of many d-matrices, but arranged to compute a derivative within each bin, without computing derivatives amongst different bins. For simplification, where there are n=6 original data interval/segments (compare to FIG. 1, right-hand-side, where there are n=12 original data intervals) that are then unbinned to produce s=5 bins per data interval, there will need to be six representations of the d matrix to compute derivatives within each of the original n=6 data intervals; however, these six copies of d must be arranged to avoid cross-bin derivative computations (i.e., derivatives computed between different of each of the n=6 bins) to ensure zero mean. FIG. 3 thus illustrates an example of matrix $d_B$ for n=6 and s=5, providing 6 copies of matrix d, each separated by a "shift" column every $5^{th}$ column to prevent cross-bin derivative computation. FIG. 4 is an intensity coding representation of the $d_B$ matrix of FIG. 3.

It should be noted that in this example, the vectors b* and $\bar{b}$ represent columns of unbinned pixel intensity data. In an alternate embodiment of this same example using pixel intensity data, the vectors b* and $\bar{b}$ can represent rows of unbinned pixel intensity data.

With continued reference to Equation (1), to determine the unbinned intensity values in vector $\bar{b}$, it is first necessary to determine, or solve for the values of the unknown elements in vector a. One way to solve for the values of the unknown elements in vector a is to impose a smoothness condition that defines or optimizes a in relation to the values of the unbinned pixel intensity values in vector $\bar{b}$. The smoothness condition is thus imposed on the full, unbinned array/result/solution and includes transitions between bins and within a bin.

In one example, the smoothness condition is a minimization of the sum of squares of the k-th order derivatives over the output pixels in vector $\bar{b}$, where k is an integer greater than or equal to 1. Mathematically, this smoothness condition, can be expressed as minimizing the gradient energy:

$$E = (d^k \bar{b}, d^k \bar{b}) = (\bar{b}, (d^k)^T d^k \bar{b}) \quad (3A)$$

in relation to a (i.e., $\delta E / \delta a = 0$). Mathematically, this may be represented as:

$$\delta(\bar{b}, \Delta^{(k)} \bar{b}) = 0 \quad (3B)$$

where $\delta$ denotes variation, or gradient energy, and $\Delta$ is a Laplacian operator known to those of ordinary skill, for computing the derivatives of the elements of unbinned vector $\bar{b}$. In an example where k=1, the Laplacian operator may thus be represented as:

$$\Delta^{(1)} = d^T d. \quad (4)$$

When continuing with the present example, d is the derivative operation matrix, for example, as shown in FIG. 2. The derivative matrix d is determined to calculate the derivative for all unbinned pixel values, which in the present example, includes of n=6 and s=5, includes 30 values. For this example, d is a matrix of size 29×30, thereby making $\Delta$ a 30×30 matrix.

Figure 5:
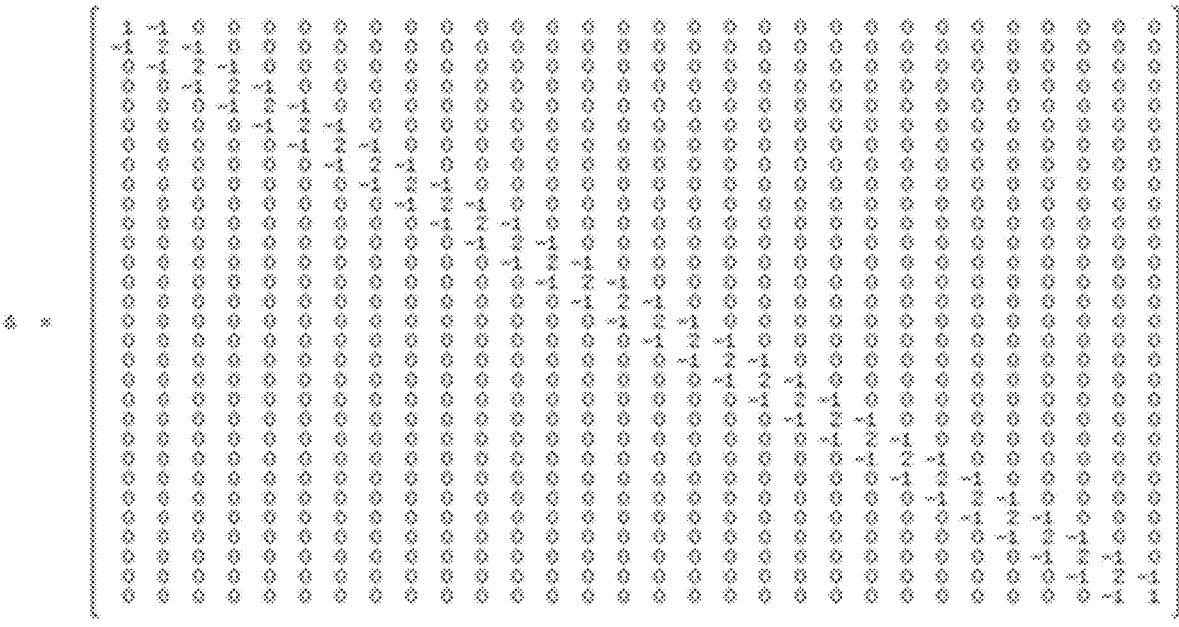
FIG. 5 is a matrix $\Delta$ for n=5 and s=6, where n is size of the original column or row vector prior to unbinning and s is the bin size.
Figure 6:
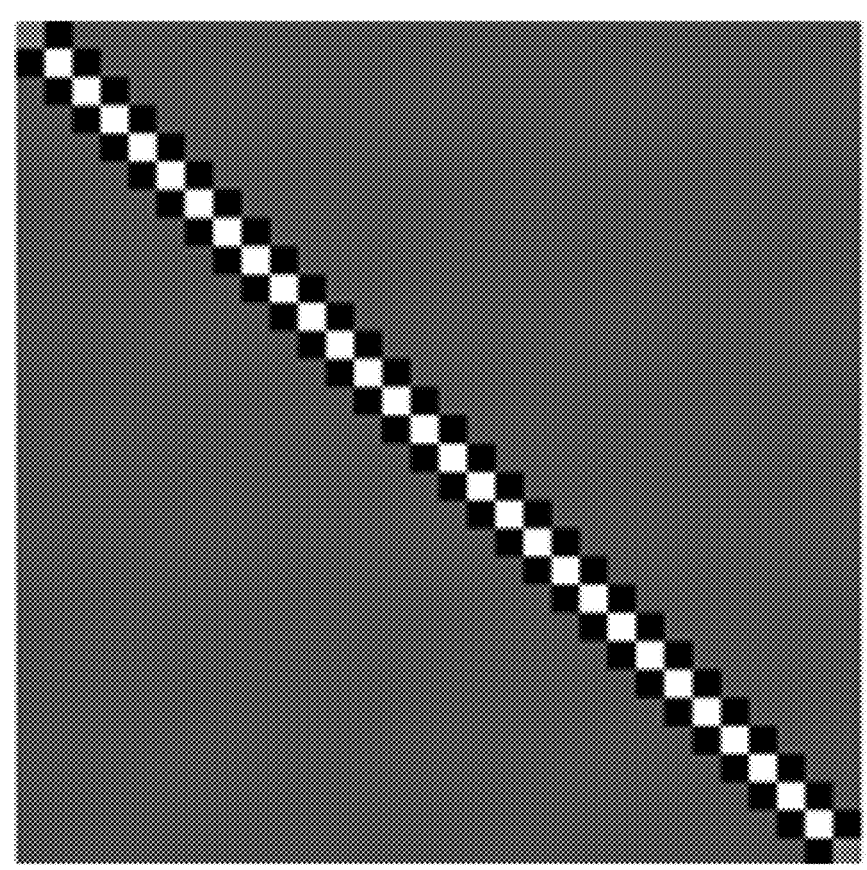
FIG. 6 is an intensity coding representation of the $\Delta$ matrix of FIG. 5.

FIG. 5 illustrates an example of the $\Delta$ matrix for n=5 and s=6, while FIG. 6 is an intensity coding representation of the $\Delta$ matrix of FIG. 5.

Figure 7:
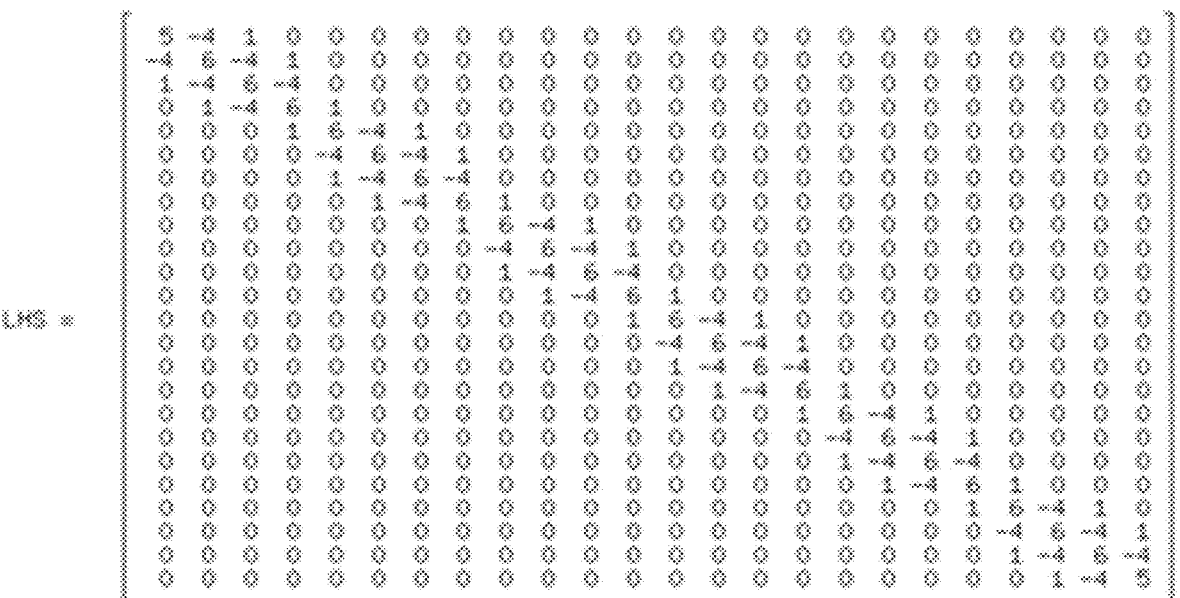
FIG. 7 is a matrix representing the left-hand side of Equation 5.

Substituting the value of $\bar{b}$ from Equation (1) into Equation (3) and minimizing with respect to vector a produces:

$$(d_B \Delta^{(k)} d_B^T) a = -d_B \Delta^{(k)} b^* \quad (5)$$

Where $d_B$ is a derivative operation matrix operating within a bin ("bin-constrained derivative matrix"). Referring to Equation 5, it can be understood that higher order derivatives may be used instead of gradient energy. FIG. 7 illustrates the matrix on the left-hand side of Equation 5

$$(\text{for } k = 1), LHS \equiv d_B \Delta^{(1)} d_B^T.$$

Figure 8:
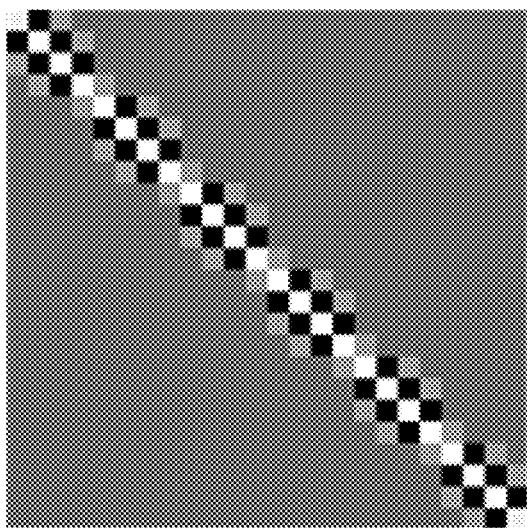
FIG. 8 is an intensity coding representation of the matrix of FIG. 7.

FIG. 8 is an intensity coding representation of the matrix of FIG. 7.

A set of linear solutions represented by Equation 5 is solved with respect to the vector of coefficients, a. Once the coefficients vector a is determined, Equation 1 is used to calculate the values of the unbinned array (e.g., pixel intensities), $\bar{b}$.

Figure 10:
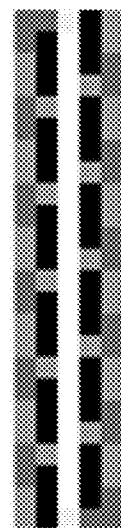
FIG. 10 is an intensity coding representation of the band matrix illustrated in FIG. 9.

In cases where n is large, the number of unknown parameters n(s-1) may easily exceed ten thousand or even one hundred thousand. Solving sets of linear equations with thousands of unknown parameters may be difficult because of possible numeric and/or memory allocation problems. However, such challenges can be avoided because the matrix represented by the left-hand side of Equation (5), one illustration of which is in FIG. 7, is nearly diagonal. Algorithms of linear algebra, e.g., those using a band matrix format, can be used. For example, the matrix in FIG. 7, which has been presented in a square matrix format, can be represented using the band format shown in FIG. 9. FIG. 10 illustrates the intensity coding representation of the band matrix in FIG. 9.

Figure 11:
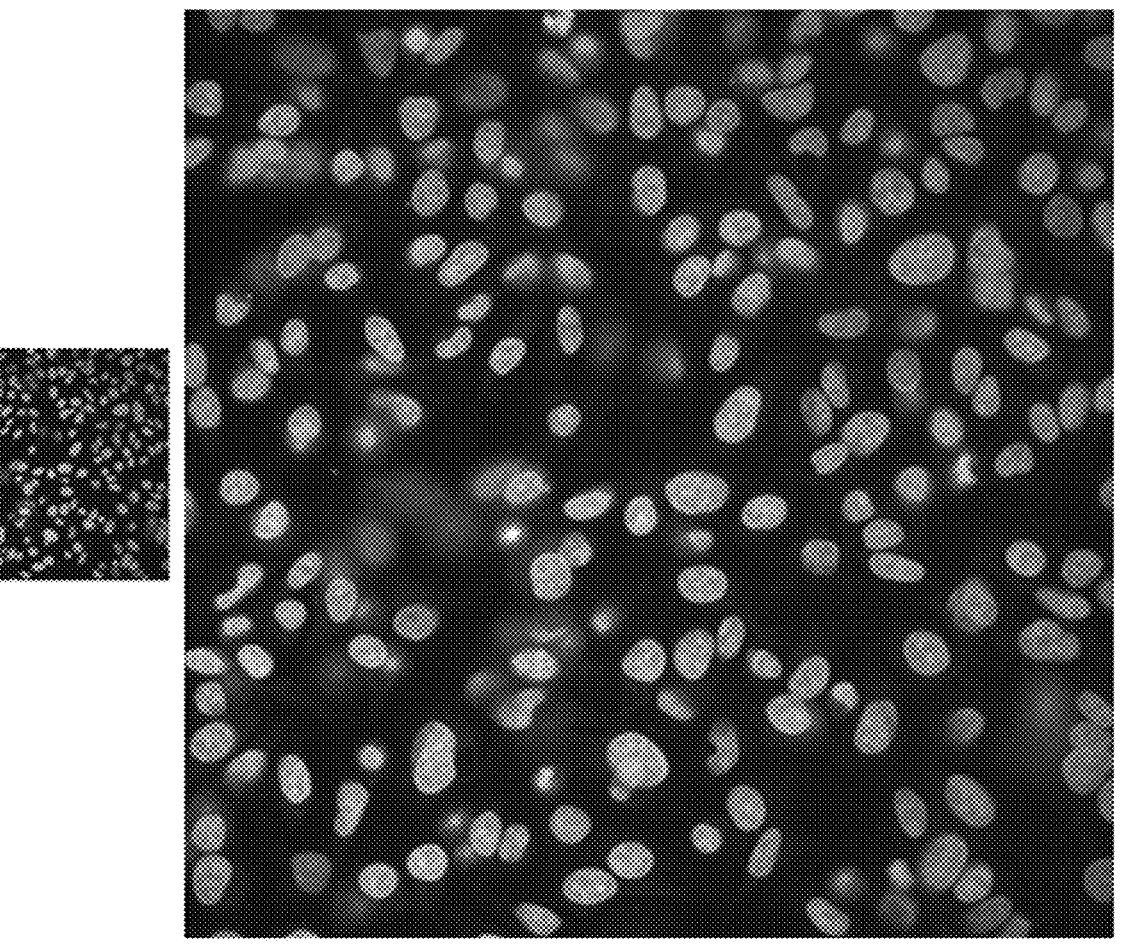
FIG. 11 illustrates images of fluorescent beads taken through a microscope objective before (left) and after (right) two-dimensional unbinning.

Unbinning in two and three dimensions can be achieved by applying one-dimensional binning in each dimension, consecutively. The result does not depend on the order of dimensions. An example of unbinning in 2D is illustrated in FIG. 11. More particularly, the left-hand image in FIG. 11 is an original image of beads taken through a microscope with an input image size of 1080×1080 pixels. The image on the right-hand side in FIG. 11 is an example of an unbinned image generated using the methodology described herein where s=4, making the output unbinned image of size 4320×4320 pixels.

Figure 12:
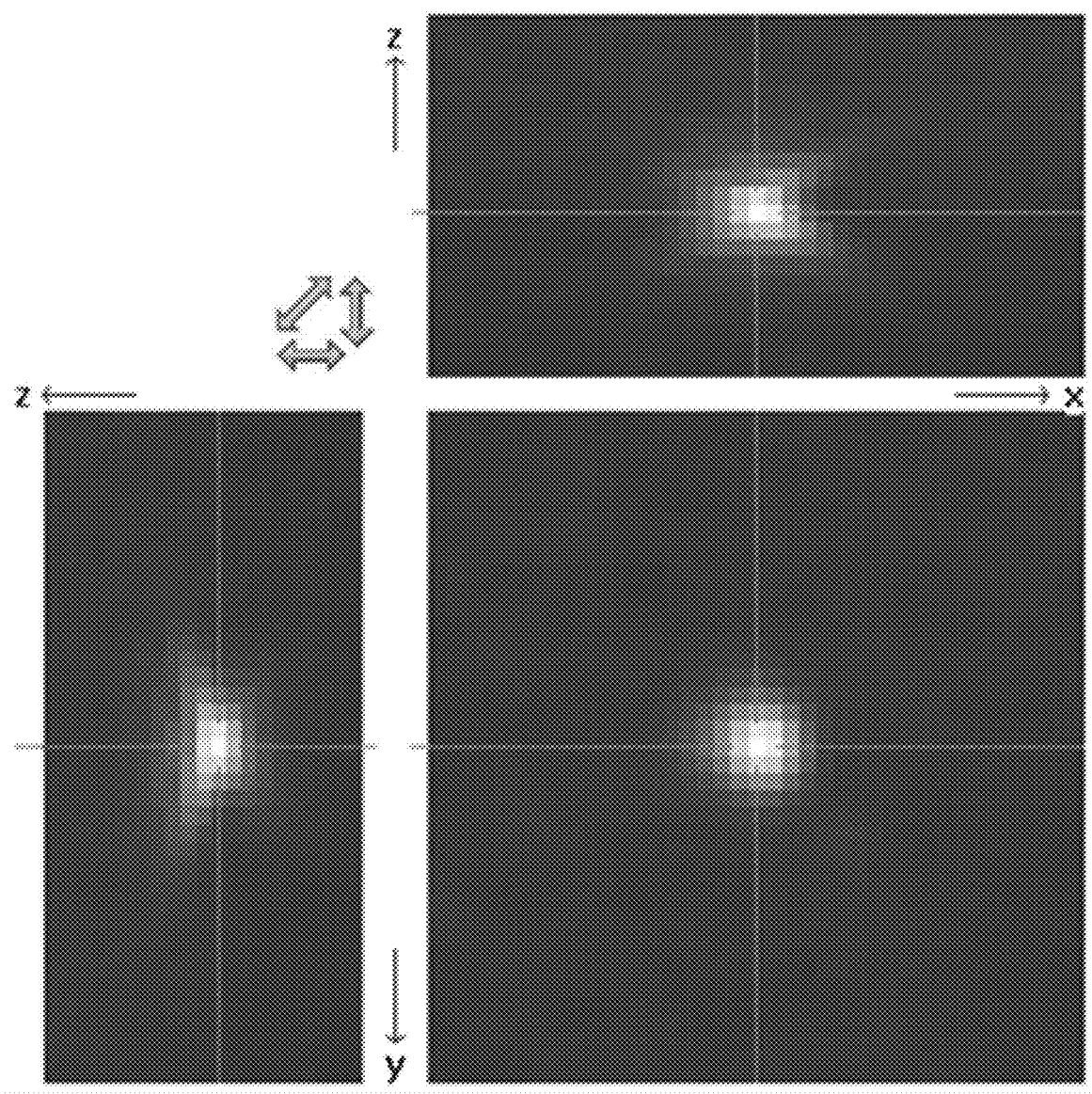
FIG. 12 is an image of an individual fluorescent bead taken through a microscope objective and prior to unbinning.

The unbinned images generated using the methodology described herein can be used in any suitable manner for image processing or display. In one example, the unbinned image data may be used to generate and visually display an image to a user. In another example, the unbinned image data can be used to perform an image processing and/or analysis task, such as characterizing properties of an optical system. If the optical system is a microscope, the unbinned image may be used to estimate the point spread function (PSF) of a microscope. For estimation of the PSF of a microscope, images of fluorescent beads, which are small compared with wavelength of emission, are acquired in 3D. Unbinning enhances the accuracy of the PSF estimation. First, beads are detected, and images of individual beads are cropped from the original image. FIG. 12 illustrates a 3D image of an individual bead cropped from an original image containing hundreds of similar beads. There are several reasons why this image of a single bead is not well suited to determine the PSF (e.g., for using in deconvolution studies). First, voxel spacing is not sufficiently small, especially in the z-dimension. Secondly, the mass center of the bead is occasionally not in the center of any voxel. In this particular example, the background is not yet subtracted.

Figure 13:
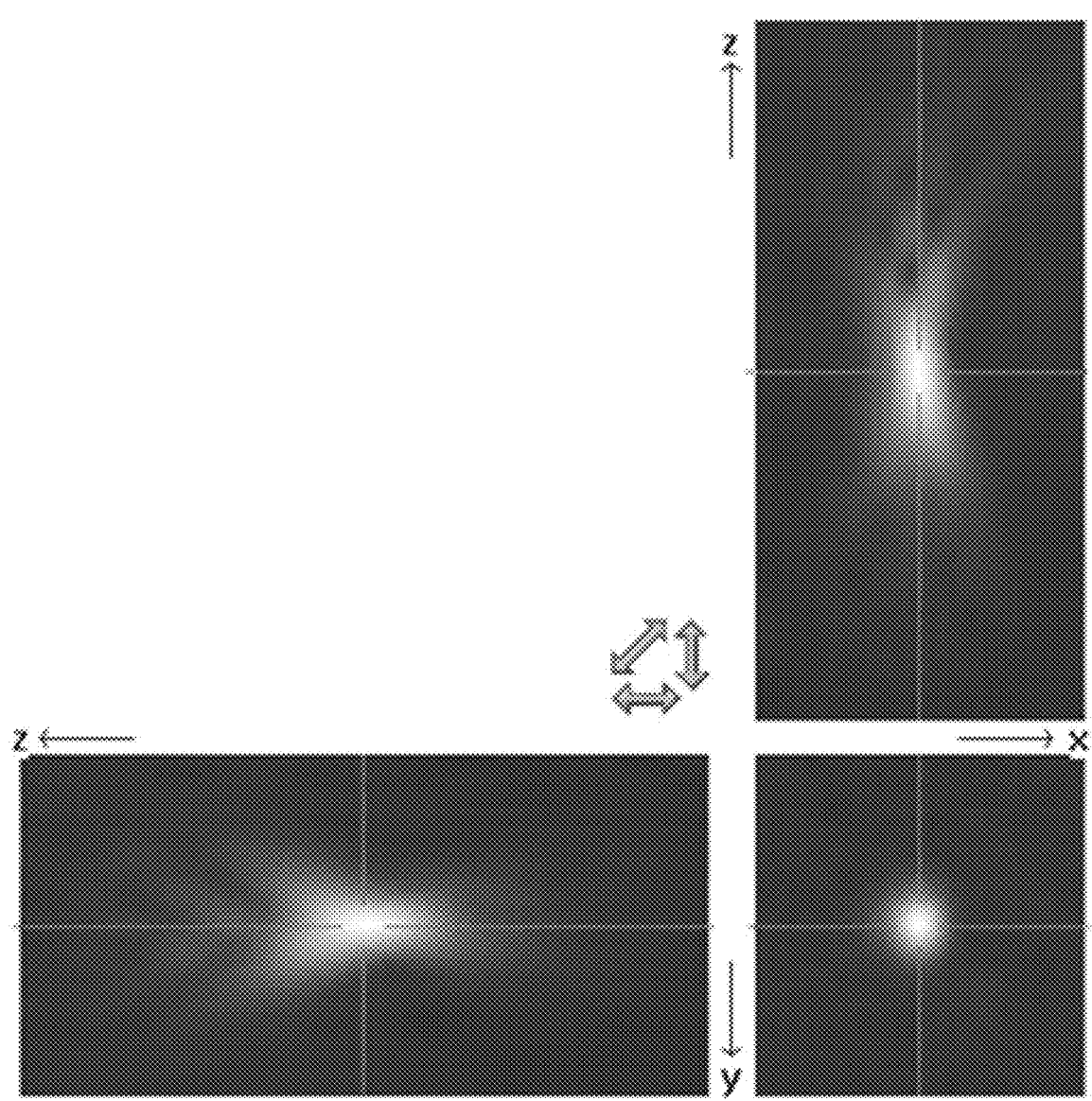
FIG. 13 is an image of the bead of FIG. 12 after unbinning.

The voxel spacing in the original image is n=0.147 μm in the x and y directions, and n=0.500 μm in z direction, where the x and y directions are orthogonal to each other and parallel to the imaging plane of the microscope. The z direction is orthogonal to the x and y directions and orthogonal to the imaging plane of the microscope. In this example, the following sizes, s, were used for unbinning: s=3 for the x and y directions, and s=11 for the z direction, yielding voxel spacing of 0.049 μm in the x and y directions, and 0.045 μm in the z direction. The result of unbinning using the methodology described herein is shown in FIG. 13. After unbinning, the image has been additionally cropped to bring the mass center of the bead to the center of the image.

Unbinning reveals a pattern aside the main peak which is difficult to perceive in the original image (compare FIGS. 12 and 13). With a dense spatial grid, the mass center of the bead can be more accurately fixed to the center of the image than with the original course grid.

The PSF of a microscope may thus be estimated by averaging images like the one in FIG. 13. For example, averaging over one hundred images reduces noise by a factor of 10. Furthermore, when averaging over hundreds of images, it is possible to identify outliers, e.g., those images produced by beads that are attached to each other.

Figure 14:
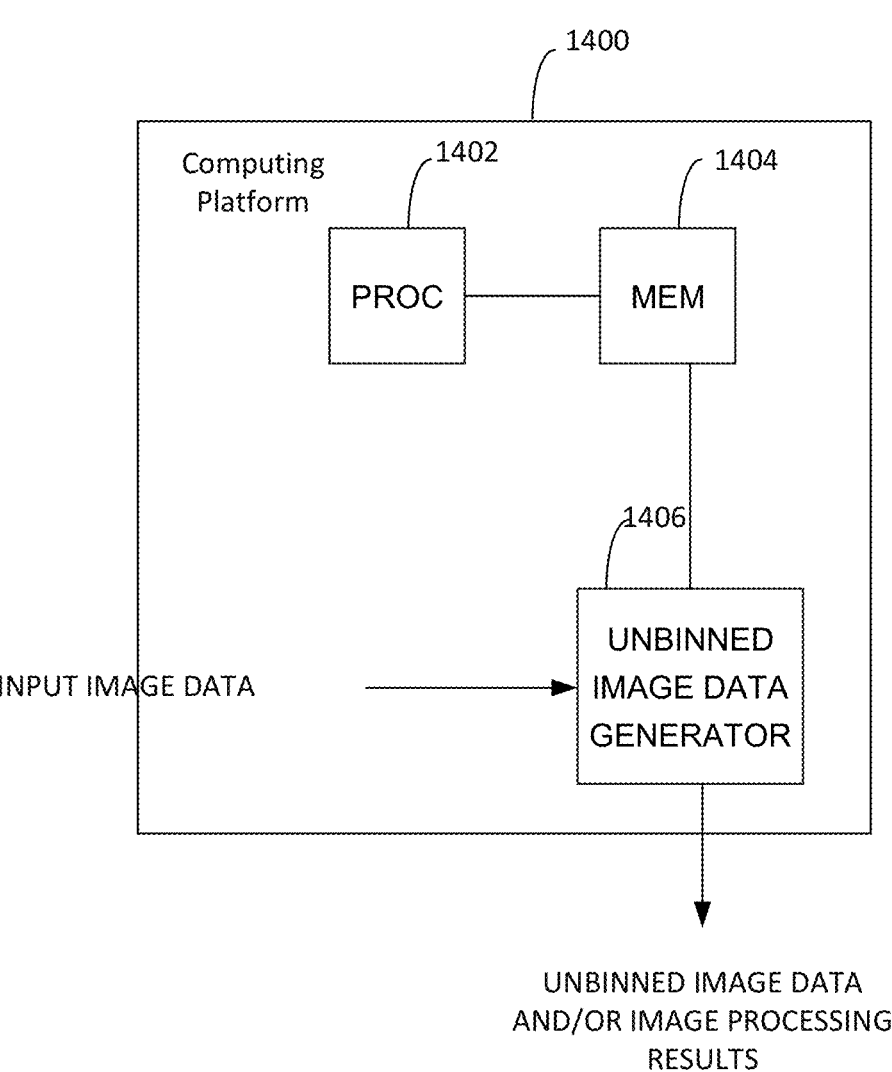
FIG. 14 is a block diagram illustrating an exemplary computing platform for generating and using unbinned image pixel intensity data.

FIG. 14 is a block diagram illustrating an exemplary computing platform for generating unbinned image pixel intensity data and/or image processing results using the unbinned image pixel intensity data. Referring to FIG. 14, computing platform 1400 may be any suitable computing platform including at least one processor 1402 and memory 1404. In one example, computing platform 1400 maybe a cloud computing platform for generating unbinned image pixel intensity data and/or image processing results as a service. In another example, computing platform 1400 maybe a personal computer or any other platform capable of analyzing and processing pixel intensity data. Computing platform 1400 includes an unbinned image data generator 1406 for receiving, as input, image pixel intensity data (prior to unbinning) and generating unbinned image pixel intensity data and/or image processing results. For example, unbinned image data generator 1406 may generate unbinned image data, such as unbinned pixel intensity data, using the methodology described herein and display the resulting output image to the user, for example, as illustrated in FIG. 13. In another example, unbinned image data generator 1406 may utilize the unbinned image data to produce an image processing result, such as the point spread function of a microscope. Unbinned image data generator 1406 may be implemented using computer executable instructions stored in memory 1404 and executed by processor 1402.

Figure 15:
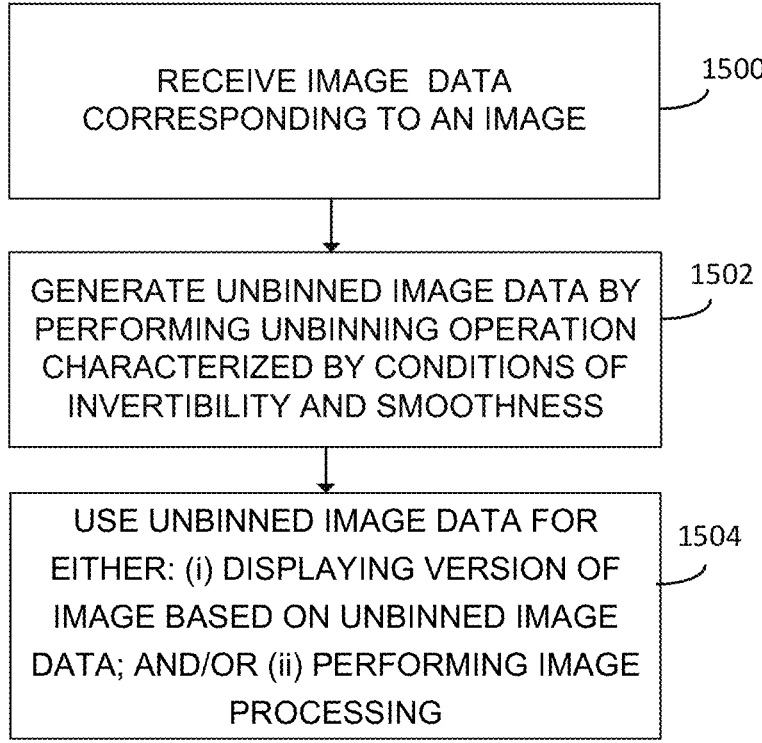
FIG. 15 is a flow chart illustrating an exemplary process for generating and using unbinned image pixel intensity data.

FIG. 15 is a flow chart illustrating an exemplary process for generating and using unbinned image pixel intensity data. Referring to FIG. 15, in 1500, the process includes receiving image data corresponding to an image. For example, unbinned image data generator 1406 may receive image data, such as pixel intensity data output from a source of image pixel intensity data, such as a microscope. The image pixel intensity data may be raw or unprocessed data. An example of such image pixel intensity data is the smaller image of the beads on the left-hand side in FIG. 11.

In step 1502, the process includes generating unbinned image data by performing an unbinning operation on the received image image/pixel intensity data, where the unbinning operation is characterized by conditions of invertibility and smoothness. For example, an unbinned image data generator 1406 may generate the unbinned image/pixel intensity data using the unbinning procedure described herein with regard to Equations 1-5. As mentioned above, "a condition of invertibility" refers to a condition that the original pixel intensity data can be restored from the unbinned pixel intensity when a binning operation is applied to the unbinned pixel intensity data. One example of a binning operation is an averaging operation where unbinned pixel intensity values are averaged. The result of averaging the unbinned pixel intensity values in each bin should be the original pixel intensity value for the bin if the unbinning operation is characterized by the condition of invertibility. "A condition of smoothness", as used herein, refers to optimization of a smoothness and/or regularity measure applied to the unbinned image/pixel intensity data. In the examples described herein, the condition of smoothness of the unbinned data is a minimization of a sum of squares of the first derivative of the unbinned pixel intensity data.

In step 1504, the process includes using the unbinned image/pixel intensity data for either: (i) displaying a version of the image based on the unbinned pixel intensity data and/or (ii) performing image processing. For example, the unbinned image data generator 1406 may display an image corresponding to the unbinned pixel intensity data, process the unbinned pixel intensity data, or both. Processing the unbinned pixel intensity data includes analyzing the unbinned pixel intensity data. In one image analysis example, the unbinned pixel intensity data can be used to determine an optical property of an optical system, such as a microscope.

An optical microscope can be characterized by a point spread function, which is a measure on how an image of a point source of light has spread in space due to diffraction. To empirically determine the point spread function, images of fluorescent beads, such as those illustrated in FIG. 11, are recorded in the focal plane and in positive and negative z directions outside of the focal plane. The stack of xy-images forms a three-dimensional image. This three-dimensional image can be unbinned in all three dimensions consecutively. Different values of bin size s can be selected in different dimensions in a manner yielding a nearly uniform resolution of the unbinned image in all three dimensions. As seen from FIGS. 12 and 13, after unbinning, it is easier to visually observe structures of the point spread function than before unbinning.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for generating and using unbinned image data, the method comprising:
   receiving image data corresponding to an image, wherein the image data comprises original pixel intensity values;
   generating the unbinned image data by performing an unbinning operation on the original pixel intensity values, wherein the unbinning operation is characterized by conditions of invertibility and smoothness, wherein the condition of invertibility requires that the original pixel intensity values be recoverable by a binning operation after the unbinning operation is performed on the original pixel intensity values, and the unbinning is performed by replacing each original pixel intensity value with multiple pixel intensity values that are unequal yet have a mean value equal to such original pixel intensity value, and subjecting the multiple pixel intensity values to the condition of smoothness by minimizing a measure of irregularity of the multiple pixel intensity values without changing the mean value of the multiple pixel intensity values; and
   using the unbinned image data for performing image processing.

2. The method of claim 1, wherein generating the unbinned image data by performing an unbinning operation on the original pixel intensity values includes:
   defining an unbinned vector b*, wherein elements of the unbinned vector b* have values that are equal to the original pixel intensity values;
   determining an unbinned vector $\tilde{b}$ as a sum of the unbinned vector b* and a correction vector, wherein the correction vector comprises a product of a transposed bin-constrained derivative vector $$d_B^T$$

and a vector of parameters a; and,
   solving for the values of the parameters a, while imposing the condition of smoothness on the unbinned vector $\tilde{b}$.

3. The method of claim 2, wherein determining the unbinned vector $\tilde{b}$ includes computing the sum using the following expression:

$$\tilde{b} = b^* + d_B^T a.$$

4. The method of claim 2, wherein solving for the values of the parameters, a, includes using the following expression:

$$\left(d_B \Delta^{(k)} d_B^T\right)a = -d_B \Delta^{(k)} b^*,$$

where $\Delta^{(k)}$ is a Laplacian operator and k is a constant.

5. The method of claim 4, wherein k=1.

6. The method of claim 1, wherein the image data comprises multi-dimensional image data, and wherein performing the unbinning operation includes performing the unbinning operation for each dimension of the multi-dimensional image data.

7. The method of claim 3, comprising applying the condition of smoothness in computing the unbinned vector $\tilde{b}$ by computing the derivative of each element in the unbinned vector $\tilde{b}$ with respect to the vector of parameters a and minimizing a sum of squares of the derivatives.

8. The method of claim 1, further comprising using the unbinned image data to determine an optical property of an optical system.

9. The method of claim 8, wherein determining the optical property includes determining a point spread function of the optical system.

10. A system for generating and using unbinned image data, the system comprising:
   a computing platform including at least one processor and a memory;
   an unbinned image data generator implemented by the at least one processor for performing an unbinning operation on image data corresponding to an image, wherein the image data comprises original pixel intensity values, and the unbinning operation is characterized by a condition of invertibility and a condition of smoothness, wherein the condition of invertibility requires that the original pixel intensity values be recoverable by a binning operation after the unbinning operation is performed on the original pixel intensity values, and the unbinning is performed by replacing each original pixel intensity value with multiple pixel intensity values that are unequal yet have a mean value equal to such original pixel intensity value, and subjecting the multiple pixel intensity values to the condition of smoothness by minimizing a measure of irregularity of the multiple pixel intensity values without changing the mean value of the multiple pixel intensity values; and,
   a memory to receive the unbinned image data for performing image processing.

11. The system of claim 10, wherein the unbinned image data generator is configured to:
   generate an unbinned vector b*, wherein elements of the unbinned vector b* have values that are equal to the original pixel intensity values;
   determine an unbinned vector $\tilde{b}$ as a sum of the unbinned vector b* and a correction vector, wherein the correction vector comprises a product of a transposed bin-constrained derivative vector $$d_B^T$$

and a vector of parameters, a; and
   solve for the values of the parameters a, while imposing the condition of smoothness on the unbinned vector $\tilde{b}$.

12. The system of claim 11, wherein the unbinned image data generator is configured to compute the sum using the following expression:

$$\tilde{b} = b^* + d_B^T a.$$

13. The system of claim 11, wherein the unbinned image data generator solves for the values of the parameters a using the following expression:

$$\left(d_B \Delta^{(k)} d_B^T\right) a = -d_B \Delta^{(k)} b^*,$$

where $\Delta^{(k)}$ is a Laplacian operator and k is a constant.

14. The system of claim 13, where k=1.

15. The system of claim 10, wherein the image data comprises multi-dimensional image data and wherein the unbinned image data generator performs the unbinning operation for each dimension of the multi-dimensional image data.

16. The system of claim 11, comprising applying the condition of smoothness in computing the unbinned vector $\tilde{b}$ by computing the derivative of each element in the unbinned vector $\tilde{b}$ with respect to the vector of parameters a and minimizing a sum of squares of the derivatives.

17. A non-transitory computer readable medium having stored thereon executable instructions that when executed by a processor of a computer control the computer to:

generate unbinned image data by performing an unbinning operation on image data corresponding to an image, wherein the image data comprises original pixel intensity values, and the unbinning operation is characterized by a condition of invertibility and a condition of smoothness, wherein the condition of invertibility requires that the original pixel intensity values be recoverable by a binning operation after the unbinning operation is performed on the original pixel intensity values, and the unbinning is performed by replacing each original pixel intensity value with multiple pixel intensity values that are unequal yet have a mean value equal to such original pixel intensity value, and subjecting the multiple pixel intensity values to the condition of smoothness includes minimizing a measure of irregularity of pixel intensity values in the unbinned image data without changing the mean value of the multiple pixel intensity values; and store the unbinned image data for performing image processing.

* * * * *